United States Patent [19]

Faget et al.

[11] Patent Number: 4,834,325
[45] Date of Patent: May 30, 1989

[54] MODULAR SPACECRAFT SYSTEM

[75] Inventors: Maxime A. Faget; Caldwell C. Johnson, both of Dickinson; David J. Bergeron, III, Houston, all of Tex.

[73] Assignee: Space Industries, Inc., Webster, Tex.

[21] Appl. No.: 713,817

[22] Filed: Mar. 20, 1985

[51] Int. Cl.[4] .............................................. B64G 1/44
[52] U.S. Cl. ................................ 244/173; 244/158 R; 244/167
[58] Field of Search ................. 244/158 R, 159, 161, 244/162, 167, 173

[56] References Cited

U.S. PATENT DOCUMENTS

| | | |
|---|---|---|
| 3,148,846 | 9/1964 | Newton ............................. 244/173 |
| 3,295,789 | 1/1967 | Hill . |
| 3,300,162 | 1/1967 | Maynard et al. . |
| 3,480,232 | 11/1969 | Wyatt ................................ 244/167 |
| 3,520,496 | 7/1970 | Wuenscher ...................... 244/159 |
| 3,709,447 | 1/1973 | Devlin . |
| 3,903,699 | 9/1975 | Davis ................................ 244/173 |
| 3,910,533 | 10/1975 | Cheatham et al. ................. 244/161 |
| 4,057,207 | 11/1977 | Hogan . |
| 4,079,904 | 3/1978 | Groskopfs et al. . |
| 4,133,502 | 1/1979 | Anchutin ........................... 244/173 |
| 4,273,305 | 6/1981 | Hinds . |
| 4,298,178 | 11/1981 | Hujsak . |
| 4,374,579 | 2/1983 | Renner et al. . |
| 4,384,692 | 5/1983 | Preukschat ....................... 244/161 |
| 4,667,908 | 5/1987 | Hayden et al. . |

FOREIGN PATENT DOCUMENTS

| | | |
|---|---|---|
| 2704844 | 9/1977 | Fed. Rep. of Germany . |
| 2815216 | 10/1979 | Fed. Rep. of Germany . |
| 2472509 | 7/1981 | France . |
| 2476018 | 8/1981 | France . |
| 1420957 | 1/1976 | United Kingdom ............... 244/158 |
| 2091194 | 7/1982 | United Kingdom . |

OTHER PUBLICATIONS

*Astronautics & Aeronautics*, pp. 59–65, May 1972.

Primary Examiner—Galen Barefoot
Assistant Examiner—Lynn M. Fiorito
Attorney, Agent, or Firm—Robbins & Laramie

[57] ABSTRACT

A modular spacecraft system adapted for orbital flight is capable of expansion by the connection of at least two substantially identical spacecraft modules, each of which is capable of independent operation. Each spacecraft module comprises a spacecraft body, at least one solar array extendible outwardly from the spacecraft body, and at least one structural interface means for connecting one spacecraft module to another spacecraft module. Methods for deployment of a spacecraft module and for assembly of a modular spacecraft system utilizing a reusable space vehicle are also disclosed.

6 Claims, 14 Drawing Sheets

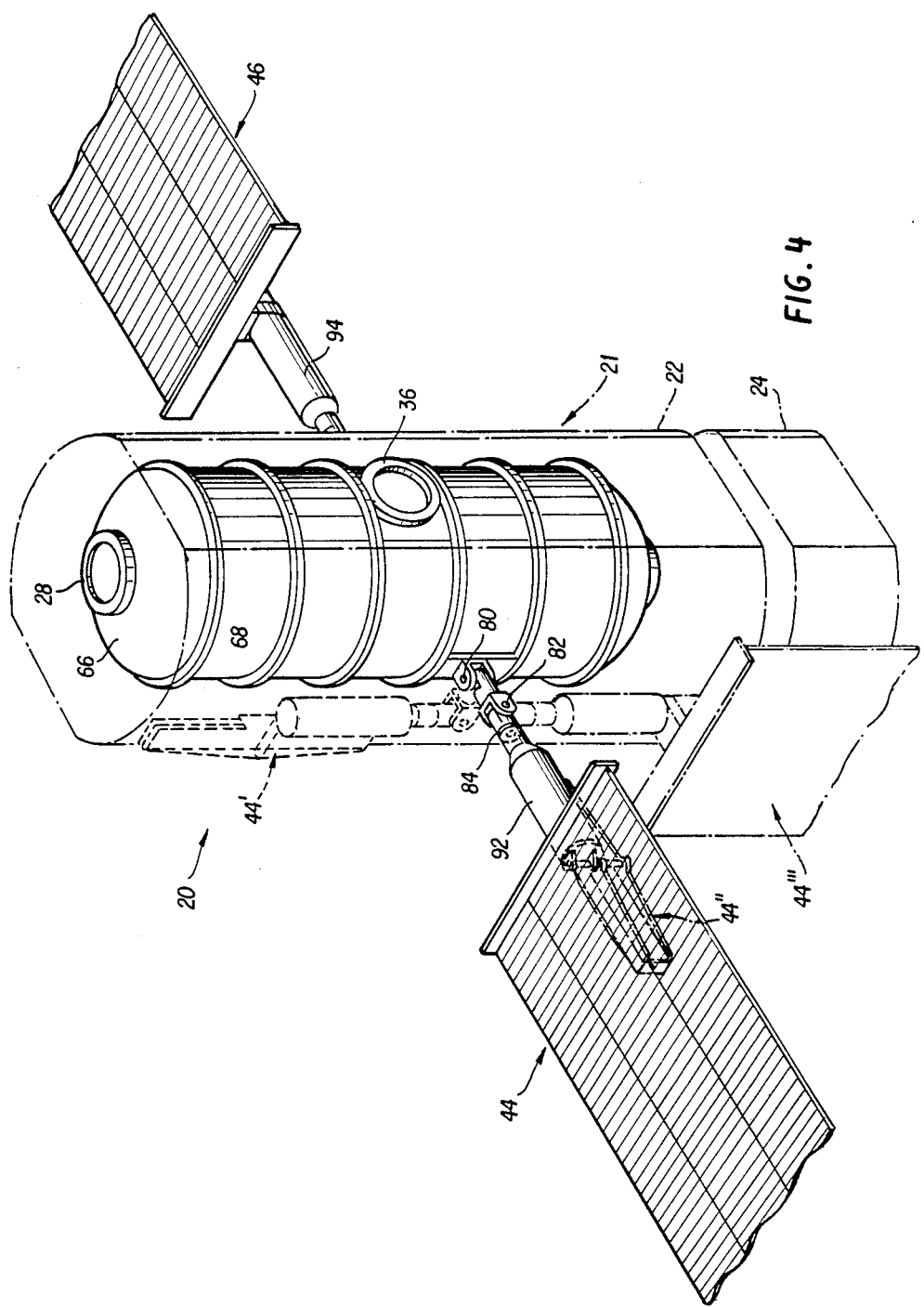

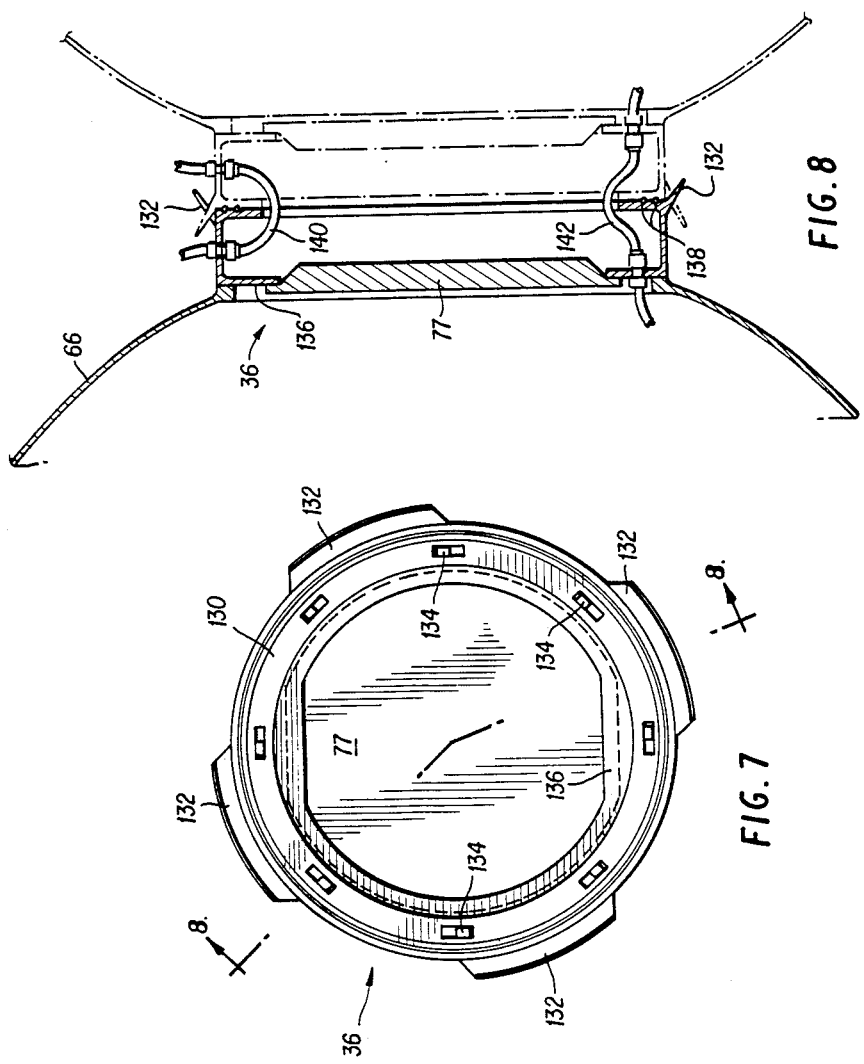

MODULAR SPACECRAFT SYSTEM

CROSS-REFERENCE TO RELATED APPLICATIONS:

Related subject matter is disclosed and claimed in U.S. patent application Ser. No. 713,816, entitled "Spacecraft Operable in Two Alternative Flight Modes", and in U.S. patent application Ser. No. 713,882, entitled "Spacecraft with Articulated Solar Array and Method for Array Deployment", both filed on Mar. 20, 1985.

BACKGROUND OF THE INVENTION

1. Field of the Invention

This invention relates to a modular spacecraft system formed by connecting substantially identical spacecraft modules, and to the construction of the individual spacecraft modules used to assemble the modular spacecraft system. The invention further relates to a method for deployment of the spacecraft modules and to a method for assembly of the modular spacecraft system.

2. Description of the Prior Art

Prior to the present invention, the concept of modular spacecraft design was limited to the combination of a number of modules having different functions to form a fully operable spacecraft. For example, a specific module might contain equipment, such as solar collection devices, antennas and other communications equipment, or other hardware and subsystems required for operation of the spacecraft, such as attitude and orbit control devices or tracking, telemetry and command equipment.

A number of modular space station designs have also been proposed in which several cylindrically-shaped modules are connected to and communicate with a central corridor or core module or modules. Solar collection devices are located at various positions on the space station. The major drawback to these proposed modular space stations is that none of the modules which are connected to the control modules can operate independently. Several modules must be connected together before the space station can be operational. Thus, modules can only be connected to the space station which can be supported by the existing structure. Another drawback is that the effort and cost of design and development of one of the various modules used to construct the space station cannot benefit significantly from the design and development of another module of different design and function. Thus, the fact that each module is of different design and cannot operate independently substantially increases the total cost and effort of design and development of the space station.

Methods suggested for construction of these proposed modular space stations have involved placing of the construction capability on the orbiting part of the station. For example, it has been suggested that a remote manipulator system (RMS), which is movable along a track, be placed on the central corridor or core module. When approached by an oribiting National Space Transportation System (NSTS), also referred to as the Space Shuttle, equipped with its own RMS and carrying an additional module for the space station, the RMS on the core module would attach to the Shuttle and bring it closer to the core module. The core module RMS would then attach to the additional module or other equipment in the Shuttle cargo bay, remove it from the cargo bay and place it in the appropriate position on the space station. Alternatively, the Shuttle RMS would attach to the additional module or other equipment in the Shuttle cargo bay and hand it to the core module RMS which would then place it in the appropriate position on the space station. All of these suggestions, however, require that elaborate construction capability be developed for use on the orbiting space station. Other suggested methods have employed free-flying vehicles to ferry modules between the Shuttle and the space station being constructed.

SUMMARY OF THE INVENTION

The limitations and drawbacks of the prior modular space station designs have been alleviated by the modular spacecraft system of the present invention. The present modular spacecraft system is designed for orbital flight about the earth or other body. The system can be expanded by the connection together of substantially identical spacecraft modules, each being capable of independent operation. Preferably, each spacecraft module is capable of independent operation as a mantended space platform suitable for industrial or research purposes. A modular spacecraft system in accordance with the present invention comprises at least two such spacecraft modules.

Each spacecraft module comprises a spacecraft body preferably having a generally cylindrical shape. In addition, the spacecraft body preferably comprises an inner chamber having a generally cylindrical shape which is located within the spacecraft body. The inner chamber is located within the spacecraft body in an eccentric position, that is, in a position such that the longitudinal axis of the inner chamber is parallel to and displaced from the longitudinal axis of the spacecraft body.

The spacecraft module further comprises at least one solar array which is extendible outwardly from the spacecraft body. Preferably, each spacecraft module comprises two solar arrays which are extendible outwardly from opposite sides of the spacecraft body. Each solar array may comprise articulation means, such as a gimbal, to permit the solar array to rotate to a position in which it does not mechanically interfere with or occlude the solar array on an adjacent spacecraft module.

The spacecraft module also comprises at least one structural interface means, such as a berthing mechanism, for connecting one spacecraft module to another spacecraft module. Preferably, the spacecraft module comprises at least two structural interface means on opposite sides of the spacecraft body. In addition, the spacecraft module may comprise a gravity gradient stabilization device which is extendible and retractable relative to the spacecraft body. Preferably, the gravity gradient stabilization device which is extendible and retractable relative to the spacecraft body. Preferably, the gravity gradient stabilization device will be extendible and retractable from one end of the cylindrical spacecraft body.

In a preferred aspect of the modular spacecraft system of the present invention, each solar array is extendible outwardly from a point on the spacecraft body which is generally along an axis parallel to one of the three orthogonal axes of the spacecraft body, the gravity gradient stabilization device is extendible or retractable relative to the spacecraft body generally along an axis parallel to a second orthogonal axis, and the structural interface means is located on a side of the spacecraft in a position normal to the third orthogonal axis. Preferably, the solar array comprises an articulation means which permits the array to rotate about an axis parallel to the axis of the spacecraft body along which the gravity gradient stabilization device is extendible and retractable, and the gravity gradient stabilization device comprises an articulation means for adjusting the angle at which the device extends from the spacecraft body.

The modular spacecraft system of the present invention has a number of significant advantages over the prior modular space station designs. Because each spacecraft module is substantially identical and capable of independent operation, the capitalization costs for the modular spacecraft system are much less, since the effort and cost involved in designing and developing one module is clearly a major part of the effort and cost involved in the design and development of subsequent modules. Each of the present spacecraft modules is preferably designed for use as a man-tended space platform for industrial or research purposes. As such, the spacecraft body contains equipment and payloads suitable for materials processing operations and other commercial processes. When two or more modules are connected to each other, the payloads or processes in two separate modules can be connected or made to interact. Since each is independently operable, the process or payload in one module may be able to benefit from the excess capacity of another module. Moreover, if there is a breakdown in power or attitude control or one of the other subsystems of one module, the corresponding subsystem in the other module can take over. Since the payloads and operational needs of the modular spacecraft system of the present invention will be resupplied at regular intervals by the Space Shuttle, resupply of two or more connected modules can be accomplished at the same time. This saves not only time but also cost, since the Shuttle would have to travel to separately orbiting spacecraft for servicing each, and the greater the distance between spacecraft the larger the amount of Shuttle fuel cost which must be borne by the user.

In accordance with a further aspect of the present invention, a method for deployment of the individual spacecraft modules and a method for assembly of the modular spacecraft system have been developed which utilize equipment presently available on the Space Shuttle or proposed for use on the Shuttle and which do not require that construction capability be placed on any of the spacecraft modules. The Space Shuttle is presently equipped with an RMS for use during Shuttle missions. Although a berthing adapter is not presently available, it has been proposed for use during future missions to provide the Shuttle cargo bay and have a berthing mechanism at its outer end for connection with an identical berthing mechanism on the space station.

In the present method, a spacecraft module comprising at least one berthing mechanism for connecting the spacecraft module to the berthing adapter is positioned within the Shuttle cargo bay. Preferably, the spacecraft module comprises at least one further berthing mechanism for connecting one spacecraft module to another spacecraft module. The spacecraft module positioned within the cargo bay comprises at least two separate elements which must be assembled to form the complete spacecraft module. In order to deploy the spacecraft module in accordance with the method of the present invention, one of the elements of the spacecraft module having a berthing mechanism is removed from the cargo bay by the Shuttle RMS and placed on the Shuttle berthing adapter, so that the berthing mechanism on the spacecraft module element connects to the berthing mechanism on the berthing adapter. The RMS then releases from the module element on the berthing adapter and attaches to another module element within the cargo bay. The RMS then removes the second module element from the cargo bay and attaches it to the first element positioned on the berthing adapter. This step is repeated with any further module elements which may be in the cargo bay until the spacecraft module is completely assembled, The RMS then attaches to the completed spacecraft module and disconnects it from the berthing adapter. Finally, the RMS releases the spacecraft module into orbital flight. The solar arrays can be deployed from the spacecraft body either before or after the spacecraft module is released by the RMS.

In a further aspect, the present invention relates to a method for assembly of a modular spacecraft system. In this method, the Shuttle carrying a first spacecraft module in its cargo bay approaches a second spacecraft module in orbit. The second spacecraft module comprises at least two berthing mechanisms, one for connection to a berthing mechanism on the Shuttle berthing adapter and another for connection to a berthing mechanism on the first spacecraft module. The first spacecraft module in the Shuttle cargo bay may be completely assembled or may comprise two or more separate elements which must be assembled to form the complete spacecraft module. In order to assemble the modular spacecraft system, the Shuttle RMS attaches to the second spacecraft module and places it on the Shuttle berthing adapter, so that one of the berthing mechanisms on the spacecraft module connects to the berthing mechanism on the berthing adapter. The RMS then releases from the second spacecraft module, and attaches to the first spacecraft module or one of the elements thereof having a berthing mechanism. The RMS removes the first spacecraft module or element thereof from the Shuttle cargo bay and attaches it to the second spacecraft module by connecting a second berthing mechanism on the second module to a berthing mechanism on the first module. If the first module comprises more than one element, the RMS then removes another element from the cargo bay and attaches it to the element previously connected to the second spacecraft module. After the first spacecraft module has been completely assembled, the RMS attaches to the assembled modular spacecraft system and disconnects it from the berthing adapter. The RMS then releases the modular spacecraft system into orbit. The solar arrays on the first module can be deployed either before or after the modular spacecraft system is released by the RMS.

BRIEF DESCRIPTION OF THE DRAWINGS

The various objects, advantages and novel features of the present invention will be more readily apprehended from the following detailed description when read in conjunction with the appended drawings, in which:

FIG. 4 is a perspective view illustrating the deployment and articulation of the solar arrays;

FIG. 7 is an elevational view of the berthing mechanism used on the spacecraft modules;

FIG. 8 is a sectional view illustrating the coupled berthing mechanisms of two spacecraft modules, with jumper lines in the vestibule area between berthing mechanisms to establish fluid connections between the two modules;

Throughout the drawings, like reference materials should be understood to refer to like parts and components.

DETAILED DESCRIPTION OF THE PREFERRED EMBODIMENT

Figure 1A:
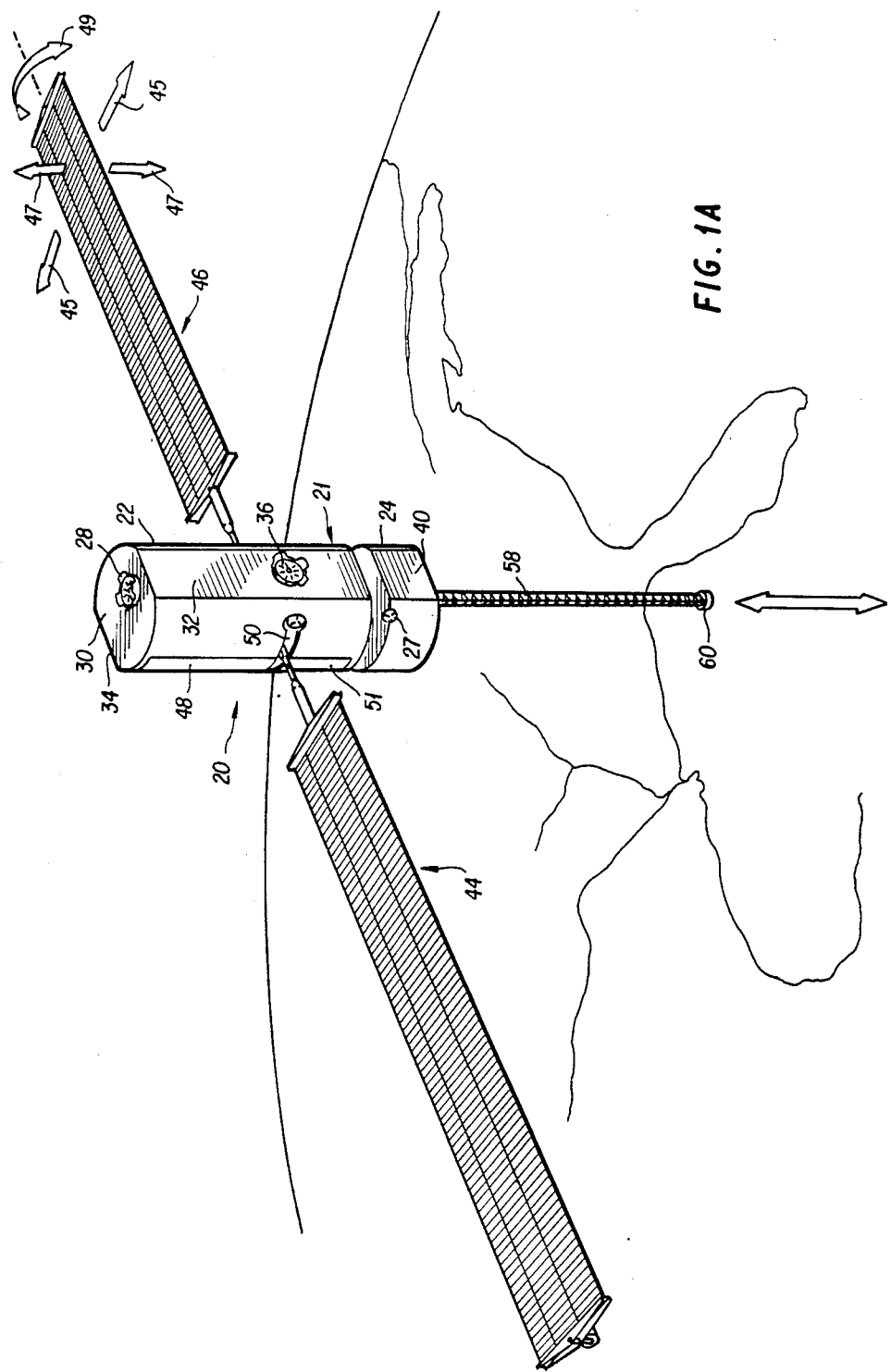
FIG. 1A is a top perspective view of a man-tended orbiting spacecraft constructed in accordance with the principles of the present invention.
Figure 1B:
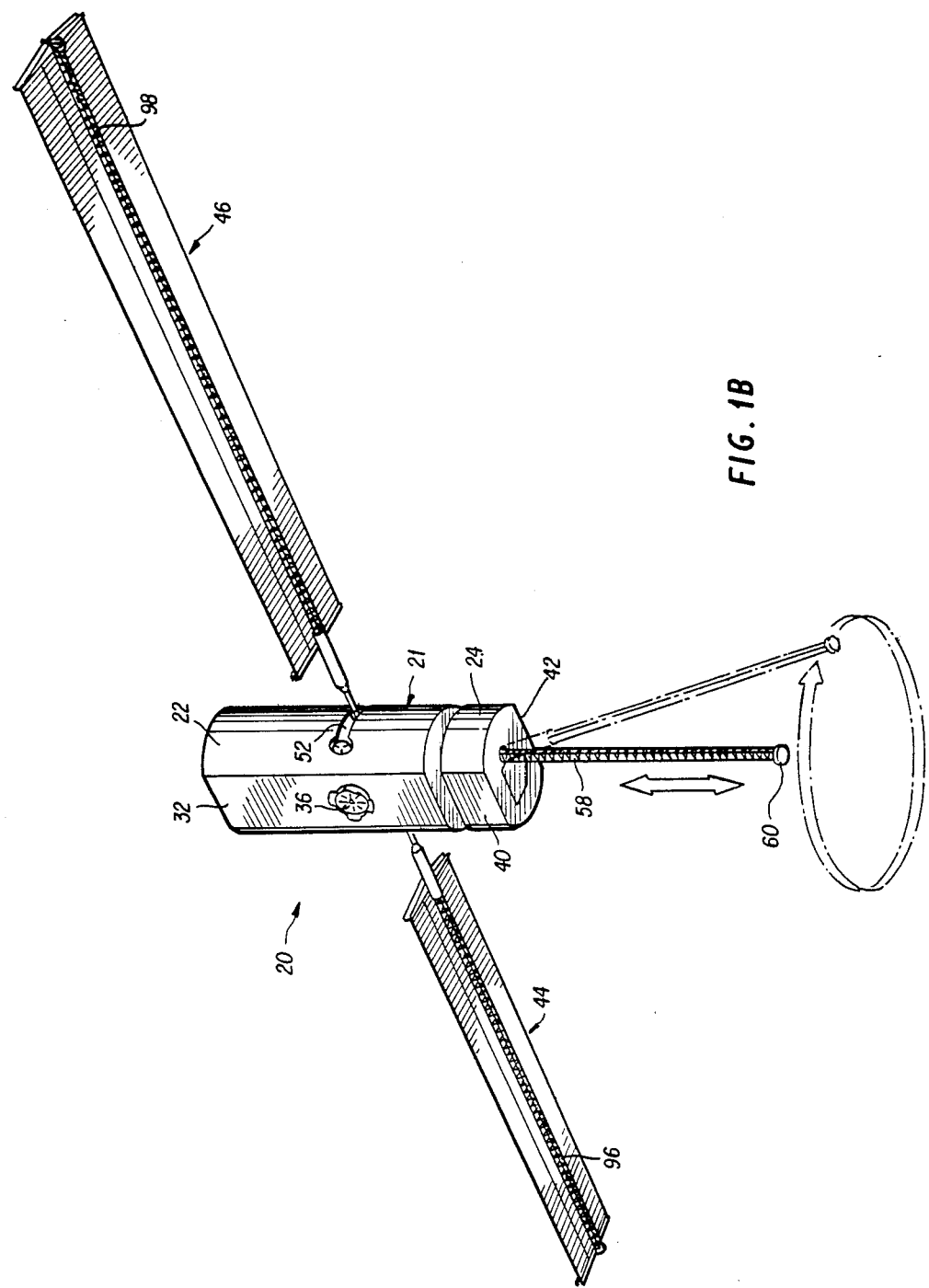
FIG. 1B is a bottom perspective view of the spacecraft, illustrating the articulation of the gravity gradient boom.

FIGS. 1A and 1B illustrate a spacecraft 20 which is constructed in accordance with the principles of the present invention. The spacecraft 20 may be of any desired type, but in the preferred embodiment it comprises a man-tended space platform which is usable for industrial or research purposes. To this end, the spacecraft body 21 comprises two generally cylindrical sections 22 and 24, the upper section 22 being referred to as the facility module and the lower section 24 being referred to as the supply or logistics module. The facility module 22 is a permanent module containing equipment and payloads appropriate to the spacecraft mission. By way of example, the payloads may be adapted to carry out materials processing operations, new product development, or life sciences research. A particularly important type of materials processing, referred to as electrophoresis operations in space (EOS), can be used for the purification of pharmaceutical and biological products. Other commercially valuable processes include the production of monodisperse latex spheres for medical applications, growth of large ultra-pure semiconductor crystals, containerless processing of fiber-optic glasses, and creation of exotic metal alloys and other composites which cannot be produced in a gravity environment. The facility module payloads can be configured as "factories" for carrying out one or more of these processes automatically and without human supervision. In addition to the payloads themselves, the facility module 22 also carries the necessary equipment to support the payloads, such as fluid tanks, pumps, batteries, power conditioning equipment, heat exchangers, and so on. The supply module 24 is a temporary or exchangeable module which provides logistic support for the facility module 22 and its payloads. In the case of an electrophoresis payload, for example, the supply module 24 is fitted with EOS media tanks, EOS product tanks, nitrogen tanks to support the EOS process, and associated plumbing lines and cooling equipment.

The spacecraft 20 shown in FIGS. 1A and 1B is intended to be placed in near circular earth orbit by means of a single, dedicated launch of the NASA Space Shuttle. The facility module 22 and supply module 24 are dimensioned to fit in the cargo bay of the Shuttle vehicle, and the outer hulls of both modules are provided with grapple fittings 26, 27 which can be engaged by the remote manipulator system (RMS) of the Shuttle to allow orbital emplacement and recapture. The spacecraft 20 is not permanently manned, but includes pressurization and life support equipment suitable for shirt-sleeve operation when berthed to the Shuttle. A berthing mechanism 28 is engageable with a berthing adapter carried in the cargo bay of the Shuttle vehicle. The spacecraft 20 and its materials processing equipment are put into automated operation before being left in orbit by the Shuttle crew. The Shuttle returns as necessary (i.e., about once every three months) with a new supply module to resupply the spacecraft payloads and the operational needs of the spacecraft, and to harvest the products manufactured. During these visits, the Shuttle crew occupy the spacecraft 20, but are sustained principally by the Shuttle. Resupply of the spacecraft and its materials processing equipment is through exchange of a fresh supply module for a depleted supply module, achieved by means of the Shuttle RMS.

The spacecraft 20 is designed to allow modular expansion by adding additional facility modules 22 and supply modules 24 in a side-by-side arrangement. This is achieved by using the Shuttle RMS to capture a spacecraft which is already in orbit, and then coupling the captured spacecraft to a second spacecraft carried in the Shuttle cargo bay. The use of two or more coupled spacecraft allows a multiplication in the capability for materials processing. The side-to-side coupling between spacecraft is facilitated by forming the outer shell of the facility module 22 with diametrically opposed flattened or planar sections 32, 34 which extend along the length of the module. Berthing mechanisms 36, 38 are provided in these flattened or planar sections of the facility module hull. (Berthing mechanism 38 is not visible in FIGS. 1A and 1B but can be seen in FIG. 2A.) Similar flattened sections 40, 42 are formed at diametrically opposed locations on the outer hull of the supply module 24, and these flattened sections are in alignment with the flattened sections 32, 34 of the facility module hull as shown.

With continued reference to FIGS. 1A and 1B, the facility module 22 carries a pair of articulated solar arrays 44, 46 which generate the electrical power required by the spacecraft 20. Electrical power is required principally for the materials processing payloads carried aboard the facility module 22, but also to some extent for guidance, navigation and attitude control functions, for data management, for environmental and thermal control, and for tracking, telemetry and related control functions. In their stowed positions, the solar arrays 44, 46 are housed behind a pair of swing-out doors 48 being partially visible in FIG. 1A. The solar arrays 44, 46 extend outwardly from opposite sides of the facility module 22 when deployed, and are joined to the facility module by a number of gimbals (shown in FIG. 2A) which permit the arrays to be rotated independently about three mutually orthogonal axes. These independent rotations are illustrated by the arrows 45, 47, 49 in FIG. 1A and are referred to as gamma, alpha, and beta rotations, respectively. The gamma rotation, represented by the arrows 45, occurs about a first axis which is parallel to the longitudinal axis of the spacecraft body 21. The alpha rotation, represented by the arrows 47, occurs about a second axis which is perpendicular to the first axis. The beta rotation, represented by the arrow 49, occurs about a third axis which is perpendicular to the second axis and parallel to the longitudinal axis of the solar array. These rotations are used to allow initial deployment of the solar arrays 44, 46 from their stowed positions within the facility module 22. In addition, periodic beta rotations are used for solar tracking, that is, for maintaining a sun-facing orientation of the solar arrays during orbital flight of the spacecraft. In principle, alpha rotations could also be used for the solar tracking function, but this is only necessary if maximum power must be generated from the arrays.

The first gimbal of each solar array, which permits the gamma rotation, is mounted inboard relative to the second and third gimbals and is affixed to an inner pressure hull (not shown in FIGS. 1A and 1B) which is supported in an eccentric position within the outer shell of the facility module 22. Since the first gimbal is physically positioned within the gap or space between the inner hull and outer shell of the facility module 22 in order to allow gamma rotation of the arrays 44, 46 to occur without interference from the outer shell. The second gimbal, permitting the alpha rotation, is located outboard relative to the first gimbal and inboard relative to the third gimbal, which allows the beta rotation. The second gimbal is external to the outer shell of the facility module when the array is fully deployed, and for that reason a separate vertical slot is not needed in the outer shell to allow alpha rotations to occur. The third gimbal is located outboard relative to the second gimbal and is also external to the outer shell of the facility module when the arrays are fully deployed as shown. The actuators for the three gimbals are driven by electric motors and provision is made for indicating the rotational position of each gimbal for control purposes.

The spacecraft 20 includes active and passive attitude control means to permit orbital flight in two alternative modes. In the preferred embodiment, the active control means comprises a pair of double-gimbal control movement gyroscopes (indicated at 69 and 71 in FIGS. 2A and 2C) to enable three-axis control. The control moment gyroscopes may be Model M325 double-gimbal units which are available from the Sperry Flight Systems division of Sperry Corporation, located in Phoenix, Ariz. Other types of active attitude control devices which can be used include momentum wheels and magnetic torquers. The passive attitude control means comprises a gravity gradient stabilization device in the form of an elongated boom 58. The boom 58 is of the coilable type and is carried by the supply module 24. A heavy mass 60 is attached to the lower end of the boom 58 in order to enhance the gravity gradient effect. In the preferred embodiment, the fully extended length of the gravity gradient boom 58 is about 100 feet, and the mass 60 comprises a 200-pound lead disk. By comparison, the combined length of the facility module 22 and supply module 24 is about 46.5 feet and the diameter of each module is about 14.5 feet. The combined weight of the facility module 22 and supply module 24 is about 36,000 pounds.

In addition to the active and passive attitude control means, the spacecraft 20 is provided with a number of cold gas thrusters (not shown) positioned at various locations on the surface of the facility module 22 and supply module 24. The cold gas thrusters are used for orbit-keeping and for maneuvering the spacecraft 20 during berthing with the Shuttle vehicle or with other spacecraft.

The gravity gradient boom 58 is extendible from and retractable into the supply module 24 and can be controlled in a variable or continuous manner so as to be capable of any desired degree of extension or retraction. With the boom 58 extended, the spacecraft 20 can be stabilized in an earth-oriented flight mode. In this orientation, the boom 58 may be directed either toward or away from the earth, although in the usual case it will be directed toward the earth. The earth-oriented flight mode provides the spacecraft with a stable attitude and requires only a minimum amount of active attitude control and orbit-keeping. With the boom 58 partially or completely retracted, the spacecraft can be stabilized in a quasi sun-oriented flight mode (i.e., with the same side always facing toward the sun) through the use of the active attitude control means. This flight mode is preferred when it is desired to obtain maximum power from the solar arrays 44, 46 for use by the materials processing payloads of the facility module 22, since in this orientation the arrays can be made to face directly toward the sun at all points in the sunlit portion of the spacecraft orbit with only occasional and minor adjustment of the solar array gimbals.

The gravity gradient boom 58 may be partially extended during quasi sun-oriented orbital flight in order to cause the two orbital-plane moments of inertia of the spacecraft 20 to be made substantially equal. This allows the spacecraft to be made neutrally stable in the orbital plane, and thus requires a minimum amount of active attitude control to maintain the spacecraft in the desired orientation. Such a capability is particularly desirable in the case of a spacecraft 20 of the type described herein, in which different types of supply modules 24 will be used to support different types of materials processing payloads in the facility module 22. The supply modules may have different sizes and masses and may therefore have the effect of changing the moments of inertia of the spacecraft 20. In addition, continual movement of fluids between the supply module 24 and facility module 22 will occur as a consequence of the materials processing operations carried out in the facility module payloads. This will cause a continual redistribution of mass within the spacecraft and hence a gradual change in the moments of inertia of the spacecraft. These effects can be counteracted by extending or retracting the boom 58 to the degree necessary to equalize the moments of inertia in the orbital plane and hence maintain neutral stability of the spacecraft. Preferably, the spacecraft 20 is designed so that in its nominal or baseline configuration it is neutrally stable when the gravity gradient boom 58 is extended by a certain fraction of its full length. In this way, the boom can be adjusted in two directions (i.e., by further extension or further retraction) to achieve neutral stability of the spacecraft when the distribution of mass changes due to the factors mentioned above.

Varying the length of the boom 58 may be used to adjust the natural frequency of the spacecraft to avoid or enhance oscillatory response. The spacecraft 20 will experience torques due to aerodynamic imbalances and other factors. These imbalances will vary, generally as some function of orbital position. The natural frequency of the spacecraft will affect its response to the torques created by these imbalances. By changing the length of the gravity gradient boom 58, the natural frequency of the spacecraft may be set at a value such that the spacecraft oscillations are minimized. Alternatively, it may be desired to enhance oscillatory response in certain situations, and this may also be accomplished by adjusting the length of the boom 58. As an example, it may be desired to induce an oscillation of the spacecraft 20 which is related to the orbital period in a manner such that solar tracking is carried out automatically, with little or no exercise of active attitude control. Further details concerning the gravity gradient boom 58 and the earth-oriented and sun-oriented orbital flight modes may be found in the copending U.S. patent application of Caldwell C. Johnson, Maxime A. Faget and David J. Bergeron III, filed on Mar. 20, 1985 under Ser. No. 713,816 and entitled "Spacecraft Operable in Two Alternative Flight Modes", which application is incorporated by reference herein.

Figure 2A:
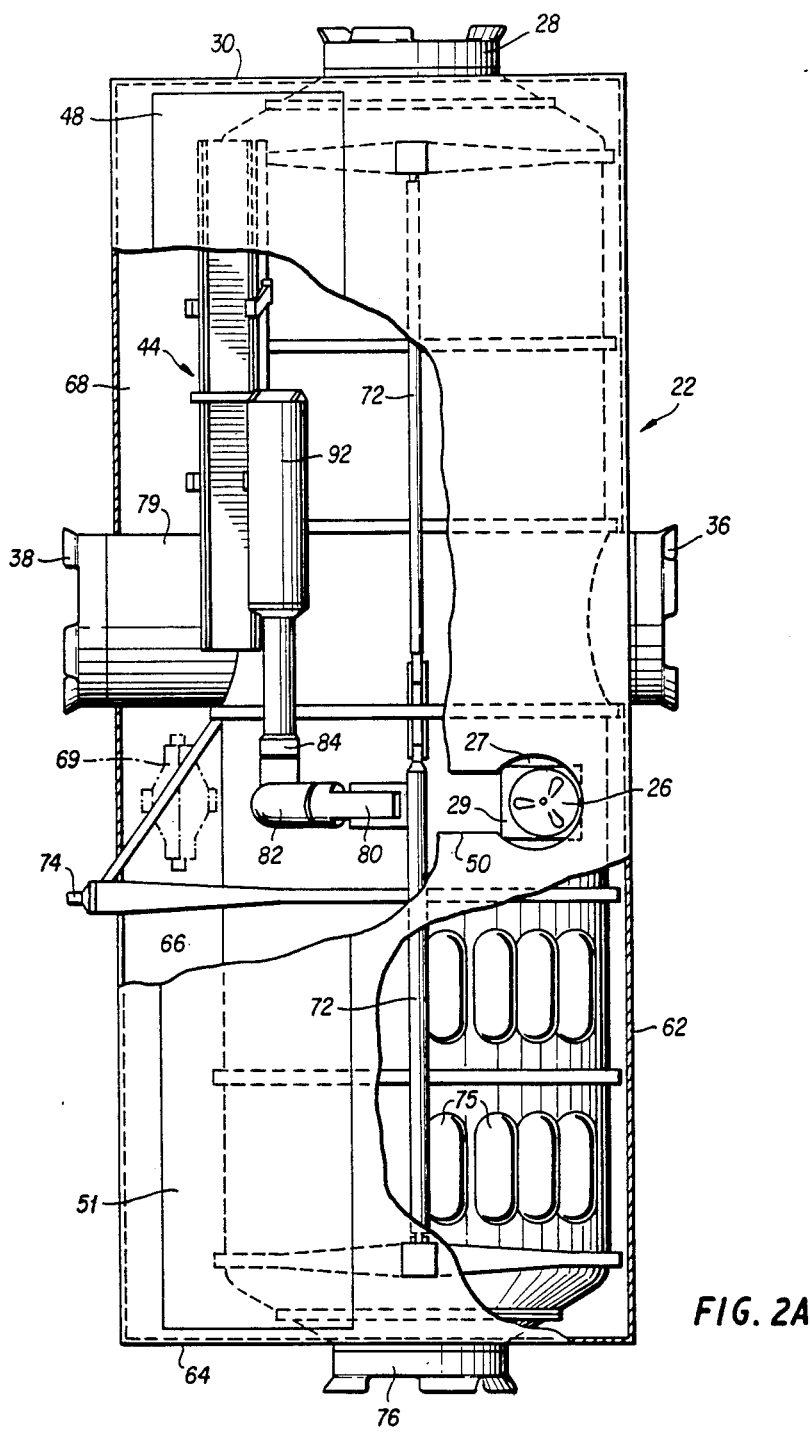
FIG. 2A is a side elevational view of the facility module which constitutes the upper section of the spacecraft body.
Figure 2B:
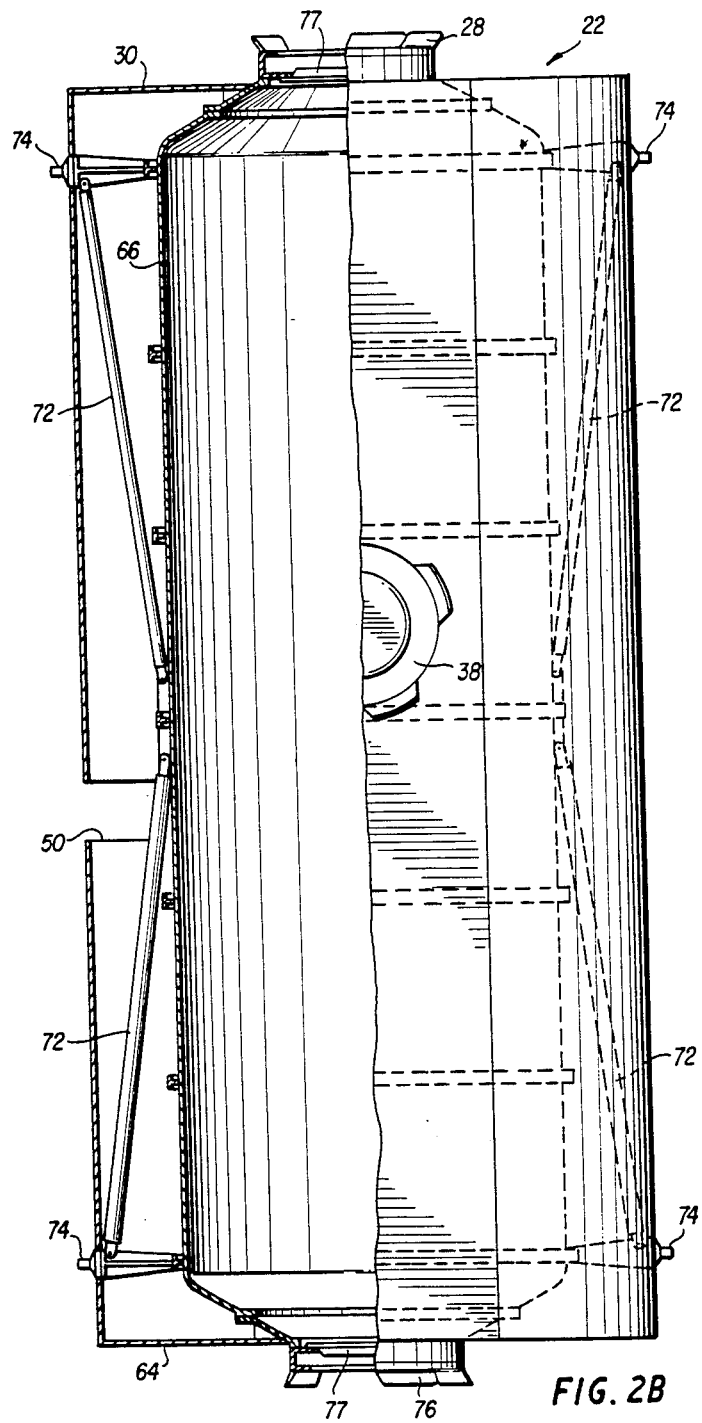
FIG. 2B is a partial side sectional view of the facility module taken from another angle.
Figure 2C:
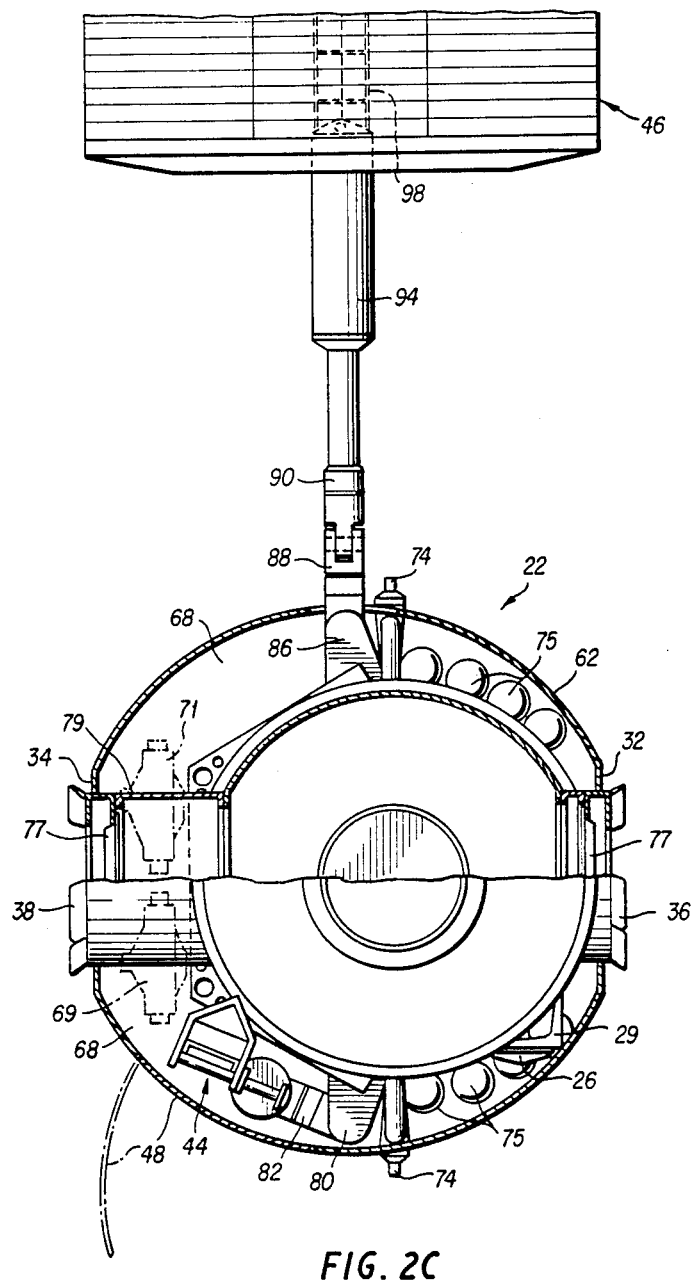
FIG. 2C is a top sectional view of the facility module, with one solar array shown in the stowed position and the other solar array shown in the fully deployed position.

The details of the facility module 22 are illustrated in FIGS. 2A, 2B and 2C. The outer shell 62 of the facility module is generally cylindrical in shape with planar or flattened portions 32, 34 extending vertically on each side as described previously. The outer shell 62 serves as a thermal and meteorite shield for the facility module and also contains integral coolant passages and manifolds allowing it to serve as a heat radiator for dissipating heat generated by the operation of the facility module and its payloads. The radiator skin is preferably pierced by a regular pattern of holes (not shown) to allow temporary or permanent attachment of mobility and restraint aids or external appertenances during extra-vehicular activity (EVA) by the Shuttle crew. The underside of the radiator may be lined with a multi-layer thermal insulation. The upper and lower ends 30, 64 of the outer shell do not serve as heat radiators but comprise discrete thermal and meteorite shields for protection of the ends of the facility module 22. The primary structure of the facility module consists of an inner pressure hull 66, which is generally cylindrical in shape and is supported within the outer shell 62. As can be seen most clearly in FIG. 2C, the vertical or longitudinal axes of the inner hull 66 and outer shell 62 are offset from each other, with the result that the inner pressure hull 62 is mounted eccentrically within the outer shell 62. This provides an external payload area 68 in the region between the inner hull 66 and outer shell 62. The external payload area 68 carries the stowed solar arrays 44, 46, the control moment gyroscopes 69, 71 that are used for active control of the spacecraft attitude, and other payload support equipment (not shown) such as batteries and power conditioning equpment, fluid tanks, heat exchangers, and so on. The upper door 48 communicates with the upper part of the external payload area 68 on one side of the facility module to allow deployment of the solar array 44. A lower door 51 serves as a continuation of the upper door 48 below the slot 50, and allows access to the lower part of the external payload area. An identical set of upper and lower doors is provided on the opposite side of the facility module where the second solar array 46 is mounted. The inner pressure hull 66 is an airtight structure made of welded aluminum alloy plate with frames and stiffeners fabricated from rolled plate. A number of air tanks 75 are affixed around the inner pressure hull 66 to provide propulsion and pressurization of the spacecraft interior. A number of internal structural elements 72 provide a supporting framework for the inner pressure hull 66 and also provide connection to the outer shell 62. The structural elements 72 also carry trunnions 74 which allow the facility module 22 to be mounted in the Shuttle cargo bay.

The inner pressure hull 66 contains the various materials processing payloads which are carried by the facility module 24. In the case of an electrophoresis payload, the EOS "factory" is mounted in the pressure hull 66 of the facility module, while the various storage tanks for EOS media, product and pressurization gas are mounted in the supply module 24. The plumbing between the facility and supply modules must be disconnected and reconnected during each supply module changeout. In addition to the materials processing payloads themselves, the interior of the pressure hull 66 is fitted with floors, walls, and ceilings to cover and protect equipment mounted against the pressure hull, and also with mobility and restraint devices such as handholds and footholds built into the floors and walls. The interior of the pressure hull 66 is also provided with suitable equipment supports to allow mounting of the materials processing payloads, and with cabinets and lockers for use by the Shuttle crew during maintenance and supply module changeout.

The facility module 22 is provided with a number of berthing mechanisms 28, 36, 38 and 76. Each berthing mechanism includes a hatch closure 77 with a viewport and each communicates with the interior of the inner pressure hull 66. The upper berthing mechanism 28 is used for berthing with a berthing adapter in the Shuttle cargo bay, and allows the Shuttle crew to enter the facility module 22 in order to service the payloads carried within the inner pressure hull 66. The lower berthing mechanism 76 allows the facility module 22 to be connected to a supply module 24 as illustrated in FIGS. 1A and 1B. The berthing mechanisms 36, 38 on the planar side areas 32, 34 of the facility module allow the facility module 22 to be joined to other identical facility modules in a side-by-side arrangement to create a modular spacecraft as described earlier. Due to the eccentric mounting of the inner pressure hull 66 with respect to the outer shell 62, the berthing mechanism 38 communicates with the interior of the inner pressure hull through a short tunnel or passage 79. Terminals for manually connecting fluid and electrical jumper lines between adjacent facility modules, or between a facility module and a supply module, are located in the vestibule areas between berthing mechanisms.

The facility module 22 is provided with a pair of grapple fittings 26, one being visible in FIGS. 2A and 2C, to enable the Shuttle RMS to remove the facility module from the cargo bay during initial activation, and to reacquire the facility for reberthing the Shuttle. The grapple fittings are recessed in apertures 27 formed in the outer shell 62 and are supported by mountings 29 which provide thermal insulation from the inner pressure hull 66.

The solar array 44 is shown in its stowed position in FIGS. 2A–2C, while the array 46 is shown in the fully deployed position. This is done for the purpose of illustration only, it being understood that both arrays will normally be in the same condition (i.e., either stowed or deployed) in the actual spacecraft. In the stowed position, used when the spacecraft 20 is being carried in the Shuttle cargo bay prior to initial activation, the arrays are housed within the external payload area 68 between the inner hull 66 and outer shell 62 as described previously. The array 44 is joined to one side of the inner pressure hull 66 by a series of connected gimbals consisting of a first or inboard gimbal 80, a second or central gimbal 82, and a third or outboard gimbal 84. The array 46 is joined to the opposite side of the inner pressure hull by an identical series of connected gimbals consisting of a first or inboard gimbal 86, a second or central gimbal 88, and a third or outboard gimbal 90. During deployment, the gimbals rotate in a prescribed order to cause the folded arrays 44, 46 to pivot out of the external payload area 68. As this occurs, the coilable masts 96, 98 (fully visible in FIG. 1B) are deployed from the canisters 92, 94 in which they are stowed, causing the arrays 44, 46 to unfurl in an accordian-like manner to their full length. Once deployed, the arrays 44, 46 are supported by the masts 96, 98 and may be periodically rotated about their longitudinal axes by the outboard gimbals 84, 90 to achieve solar tracking. The arrays 44, 46 may also be rotated about axes parallel to the longitudinal axis of the spacecraft body 21 by the inboard gimbals 80, 86 to provide adequate clearance between adjacent panels when several facility modules 22 are connected together to create a modular spacecraft system. Further details of the solar arrays 44, 46 and the array deployment sequence may be found in the copending U.S. patent application of Caldwell C. Johnson, Maxine A. Faget and David J. Bergeron III, filed on Mar. 20, 1985 under Ser. No. 213,882 and entitled "Spacecraft with Articulated Solar Array and Method for Array Deployment", which application is incorporated by reference herein.

Figure 3A:
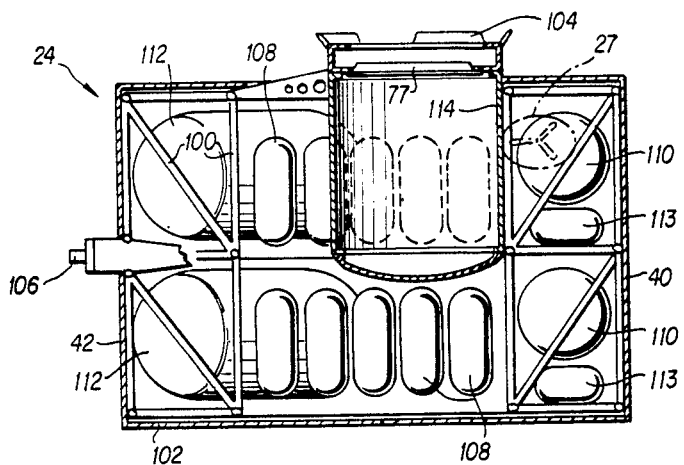
FIG. 3A is a side sectional view of the supply module which constitutes the lower section of the spacecraft body.
Figure 3B:
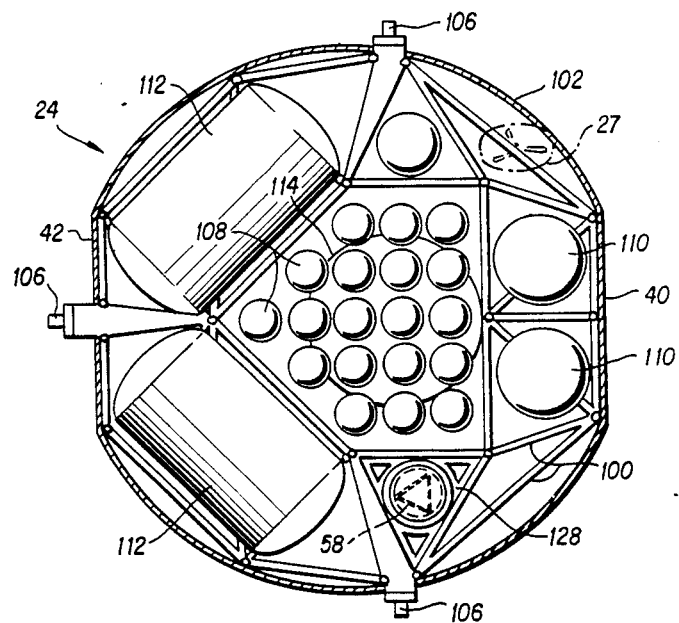
FIG. 3B is a bottom sectional view of the supply module.

FIGS. 3A and 3B illustrate the details of the supply module 24. The function of the supply module is to carry expendables and some equipment required for operation of the spacecraft 20, and virtually all of the expendables required by the facility module paylods. The supply module 24 includes an inner spaceframe 100 which is fabricated from aluminum alloy weldments and extrusions. The spaceframe 100 supports a thermal and meteoroid shield 102 comprising removable panels which surround the entire module 24, except in the areas over the berthing mechanism 104 and the opening (not shown) for the gravity gradient boom 58. If desired, the outer shield 102 may incorporate a heat radiator to augment the cooling system of the facility module 22. Protruding from the outer shield 102 and affixed to the spaceframe 100 are a number of trunnions 106 which are used for securing the supply module in the cargo bay of the Shuttle vehicle.

The interior of the supply module 24 contains a number of air storage tanks 108 which are used for propulsion and to provide a pressurized environment in the spacecraft. The supply module also contains a number of fluid storage tanks to support the materials processing operations carried out in the facility module 22. In the exemplary case of an electrophoresis (EOS) payload, a number of product tanks 110 are located in one side of the supply module so as to be accessible when the module is in the Shuttle cargo bay. A number of larger tanks 112 are also provided in the supply module for containing the EOS media. The tanks 110, 112 are well insulated with minimum thermal shorts to the supply module structure, and are preferably provided with active cooling means (not shown) to maintain the EOS product and media at the proper temperature. In addition to the EOS product and media tanks 110, 112, the supply module 24 contains a number of nitrogen tanks 113 to support the EOS process.

The interior of the supply module 24 includes a small pressurizable chamber 114 that communicates with the berthing mechanism 104 so as to be accessible from the interior of the facility module 22 when the two modules are coupled together. The berthing mechanism 104 of the supply module 24 connects to the lower berthing mechanism 76 of the facility module 22, and fluid and electrical connections between the two modules are made by manually connected jumper lines (not shown). The pressurizable chamber 114 facilitates the manual connection of these lines by the Shuttle crew. The grapple fitting 27 allows the supply module 24 to be engaged by the Shuttle RMS and is mounted in a recessed position with respect to the outer shell 102 of the supply module, similar to the manner in which the grapple fittings 26 of the facility module 22 are installed.

FIG. 4 is a perspective view illustrating in more detail the deployment and articulation of one of the solar arrays 44 carried by the facility module 22. It should be understood that the construction and operation of the second array 46 is substantially identical. The construction of both arrays, outboard of the gimbal systems 80, 82, 84 and 86, 88, 90, is based on a design by the Space Systems Division of Lockheed Missiles and Space Company, Inc., of Sunnyvale, Cal., referred to as the LMSC Solar Array Flight Experiment (SAFE). In the fully stowed position 44', the array is housed in the external payload area 68 of the facility module as indicated in hidden lines in FIG. 4. The deployment sequence begins with a 90° rotation of the array 44 and canister 92 about the inboard gimbal 80, causing the array to emerge from the external payload area through the door 48 of FIG. 1A. The array 44 and canister 92 then rotate 90° about the second gimbal 82 in order to align the canister in an outwardly facing position with respect to the facility module 22. This corresponds to the intermediate position 44" of the array in FIG. 4. The next deployment step consists of a 90° rotation of the array with respect to the canister 92, in order to orient the array so that it will unfurl as described in the next step of deployment. This rotation occurs only during the initial deployment sequence and does not occur again during normal operation of the array. The next deployment step consists of the extension of the coilable mast 96 from the canister 92, which causes the array to unfurl in an accordian-like manner in a direction away from the facility module 22. This is followed by a rotation of 180° about the outboard gimbal 84 in order to place the array in the solid line position 44 of FIG. 4, that is, with the solar collecting surfaces of the array facing upwardly and the coilable mast on the underside of the array.

Although at this point the array 44 is in its fully deployed position, a further 90° rotation about the central gimbal 82 is carried out to bring the array to the phantom position 44''' of FIG. 4. This is done to facilitate orbital emplacement of the spacecraft 20 from the Shuttle vehicle. In this connection, it is noted that the spacecraft 20 is berthed to the Shuttle during initial deployment by means of the upper berthing mechanism 28 of the facility module 22, and, as a result, the berthed spacecraft 20 is oriented with the supply module end facing away from the Shuttle. In the phantom position 44''', the array is also facing in this direction. The array is maintained in the phantom position 44''' during and after removal from the Shuttle berthing adapter, to protect the array from the plume created by the Shuttle engines. After the spacecraft 20 is clear of the Shuttle vehicle, a 90° rotation is carried out about the gimbal 82 in the reverse direction in order to restore the array to the solid line position 44, its nominal operational position.

During normal operation of the spacecraft 20, the array 44 is periodically rotated about the outboard gimbal 84 to achieve solar tracking. While it is sometimes useful to combine these rotations with rotations about the central gimbal 82 to improve solar tracking, this is ordinarily not necessary. An additional use of the central gimbal 82, after initial deployment of the solar arrays, is to pivot the arrays to a protected position during Shuttle berthing. The inboard gimbal 80 is used to move the solar arrays out of the way during supply module changeout, and is also used to prevent interference between the arrays of coupled spacecraft during modular expansion as will now be described with reference to FIGS. 5 and 6.

Figure 5:
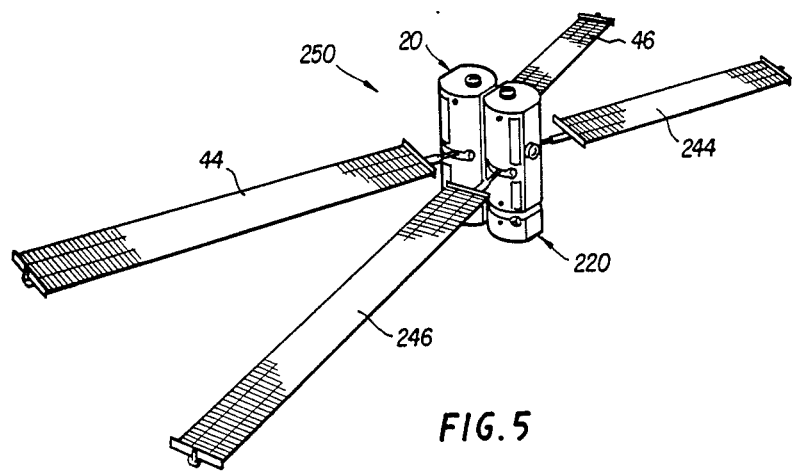
FIG. 5 is a perspective view of a modular spacecraft system comprising two identical spacecraft modules of the type described herein.

FIG. 5 illustrates a modular spacecraft system 250 consisting of two identical spacecraft modules 20, 220 of the type described above. The two spacecraft modules are joined by their berthing mechanisms 36 (shown in FIG. 1), thereby forming a side-to-side connection as shown. In this configuration the eccentric inner hulls 66 of the two spacecraft are closest to each other. Fluid and electrical lines are established between the two spacecraft in the vestibule area between the coupled berthing mechanisms as described earlier. As can be seen in FIG. 5, the adjoining pairs of solar arrays 44, 246 and 46, 244 of the spacecraft modules 20, 220 are rotated in opposite directions about their inboard gimbals 80 in order to produce an angular spread or spacing between the arrays. This avoids mechanical interference between the adjoining arrays and also prevents one array from significantly occluding the other with respect to incident solar radiation.

Figure 6:
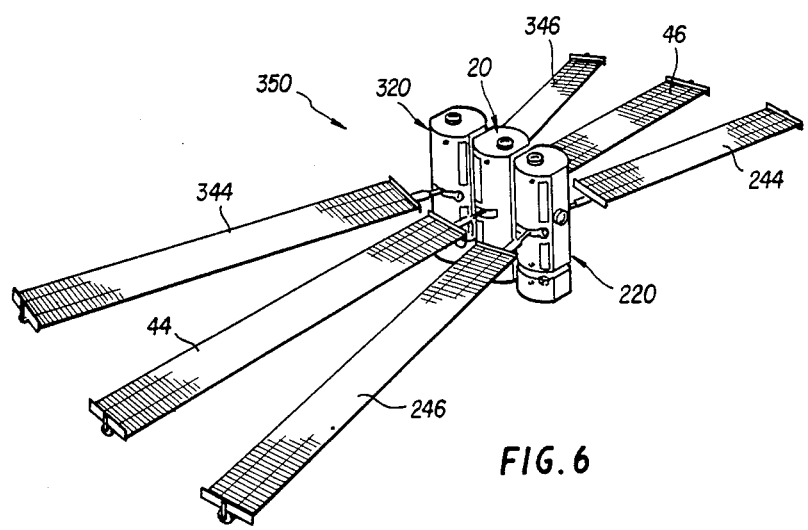
FIG. 6 is a perspective view of a modular spacecraft system comprising three identical spacecraft modules of the type described herein.

FIG. 6 illustrates a modular spacecraft system 350 consisting of three identical spacecraft modules 20, 220 and 320. The first two spacecraft modules 20, 220 are joined in the same way as shown in FIG. 5. The third spacecraft module 320 is joined by its berthing mechanism 36 to the second berthing mechanism 38 of the first spacecraft module 20, and thus has its pressure hull 66 in physical communication with those of the first two spacecraft modules 20, 220. Fluid and electrical connections may be established between the third module 320 and the first module 20 in the vestibule area between their respective berthing mechanisms. In the three-module system of FIG. 6, interference between adjoining solar arrays is avoided by rotating the arrays 244, 346 and 246, 344 in opposite directions about their inboard gimbals 80 as shown. The arrays 44, 46 of the first spacecraft module 20 occupy a central position between those of the second and third modules and hence do not require this rotation to provide clearance.

The two-module and three-module systems of FIGS. 5 and 6, respectively, provide an increased material processing capability as well as increased generation of electrical power from the additional sets of solar arrays. Hence it is possible to carry out materials processing operations on as large or small a scale as desired, merely by combining different numbers of modules. In the illustrated embodiment, it is possible to join up to six or more modules in a side-by-side arrangement and still have sufficient gimbal travel to avoid unacceptable shading and mechanical interference between the arrays of adjacent spacecraft. Since each module is capable of operating independently and carries its own payloads, solar arrays, heat radiators, fluid storage tanks, and so on, multiple-module systems are possible without exceeding the capacities of the individual units. Thus, orderly growth of the modular spacecraft system is possible without the need to alter the basic module design. In addition, logistic support is simplified since the Shuttle vehicle is required to visit only one modular spacecraft system, rather than several individual spacecraft at different locations.

FIG. 7 is an elevational view of the berthing mechanism 36 of the spacecraft 20. The remaining berthing mechanisms 28, 38, 76 and 104 will be understood to be identical in construction. The berthing mechanisms are androgynous in the sense that the principal functions of berthing can be carried out by any two mechanisms without such mechanisms being required to be matched pairs. The berthing mechanism 36 includes a rim 130 carrying four equally spaced alignment guides 132 to allow berthing in clocking increments of 90°. The rim 130 also carries eight equally spaced structural latches 134 which operate according to the latch-on-latch concept; that is, the extended latches of one mechanism engage the retracted latches on the other when the two mechanisms are within a certain distance from each other. Separate capture latches may be employed, if desired, but are not illustrated in the drawings. The hatch closure 77 is retained within the rim 130 behind a lip 136. The hatch closure may be provided with a viewport (not shown).

FIG. 8 is a sectional view illustrating the berthing mechanism 36 coupled to an identical berthing mechanism (shown in phantom) of another spacecraft. Engagement between the two berthing mechanisms is accomplished without discrete impact attenuation devices. Two concentric seals 138 are carried by each berthing mechanism, and the seals bear against each other to form an airtight connection between the spacecraft. Fluid and/or electrical connections between spacecraft are made manually by "jumpers" passing through the vestibule area between berthing mechanisms. In FIG. 8, the jumper line 140 connects fluid and/or electrical lines which are external to the two spacecraft, while the jumper line 142 connects fluid and/or electrical lines which are internal to the two spacecraft.

Figure 9:
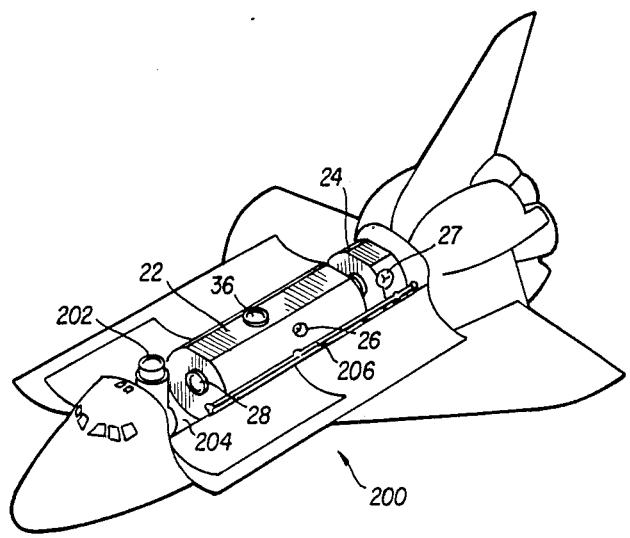
FIGS. 9-14 illustrate the deployment sequence for a first spacecraft module in accordance with the present invention.

FIGS. 9–14 illustrate the deployment sequence for a first spacecraft module in accordance with the present invention. FIG. 9 illustrates the initial launch configuration in which the Shuttle 200 has been fitted with a berthing adapter 202, an egress hatch (not shown) to its cargo bay 204, and a remote manipulator system (RMS) 206 mounted to its port side. Facility module 22 is located in the forward part of the cargo bay 204 and supply module 24 is located to the rear of the facility module 22. The facility module 22 and the supply module 24 are not berthed or connected to each other in the cargo bay 204.

Upon attaining an acceptable orbital position, Shuttle 200 assumes an attitude with its cargo bay 204 facing earth and its nose pointing aft along the flight path. FIGS. 9-18 show the Shuttle 200 with its cargo bay 204 facing upward. It will be understood that these figures illustrate the Shuttle in an attitude which is the reverse of its actual attitude with respect to the earth.

Figure 10:
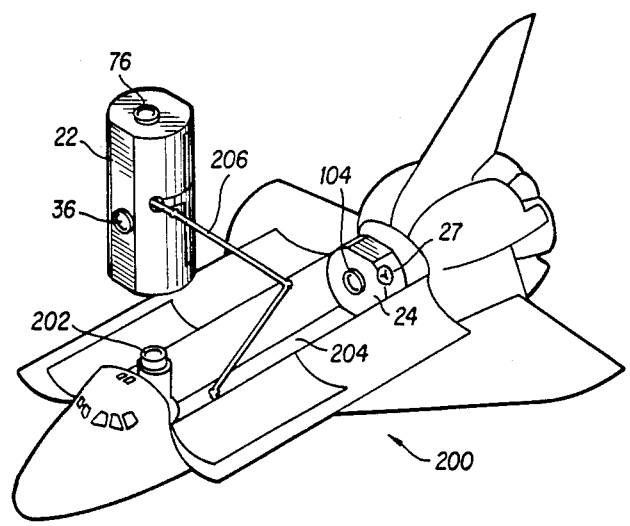

Referring to FIG. 10, the Shuttle RMS 206 attaches to grapple fitting 26 on the facility module 22, extracts the facility module from the cargo bay 204, and connects berthing mechanism 28 to berthing adapter 202.

Figure 11:
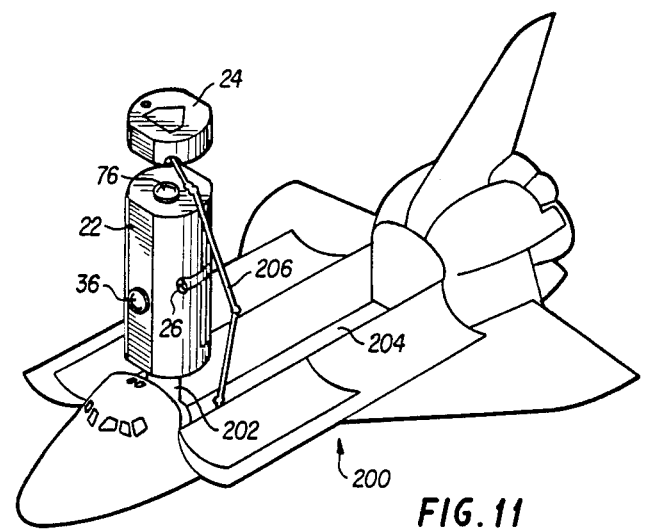

Referring to FIG. 11, after the facility module 22 is berthed, the Shuttle RMS 206 attaches to grapple fitting 27 of the supply module 24, extracts the supply module from the cargo bay 204, and connects berthing mechanism 104 of the supply module with berthing mechanism 76 of the facility module. Electrical and fluid connections are then made manually in the vestibule area between berthing mechanisms 76 and 104.

Figure 12:
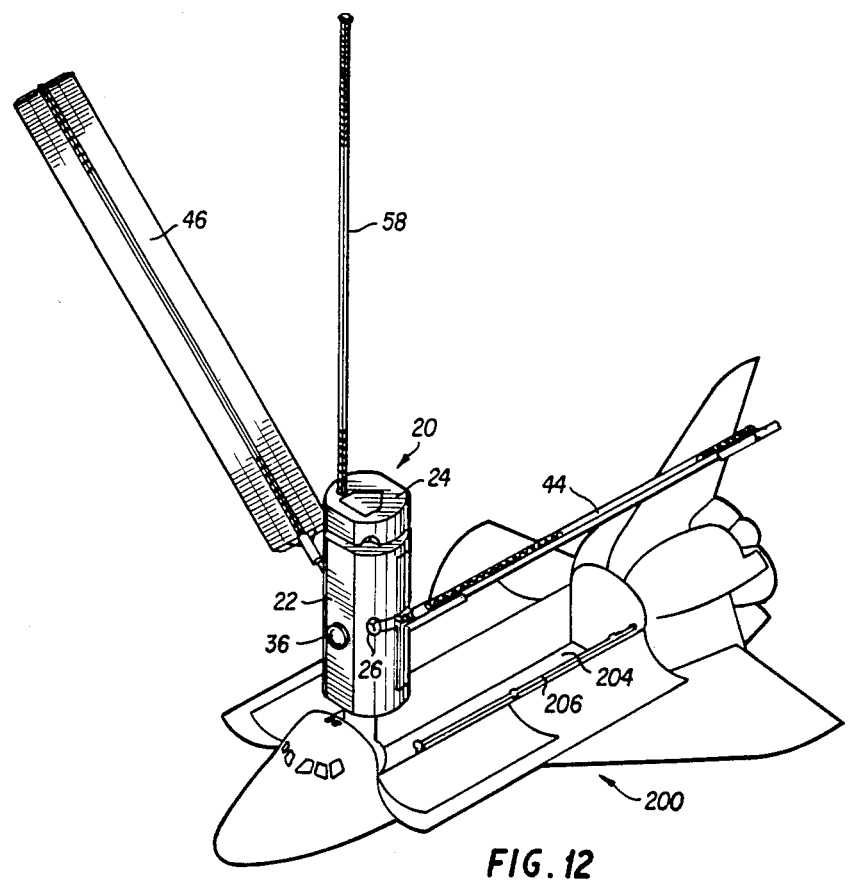

Referring to FIG. 12, the gravity gradient boom 58 is deployed and excited in bending by the Shuttle 200 to validate its structural integrity. The solar arrays 44 and 46 are then deployed and exercised through much of the range of their gimbals.

Figure 13:
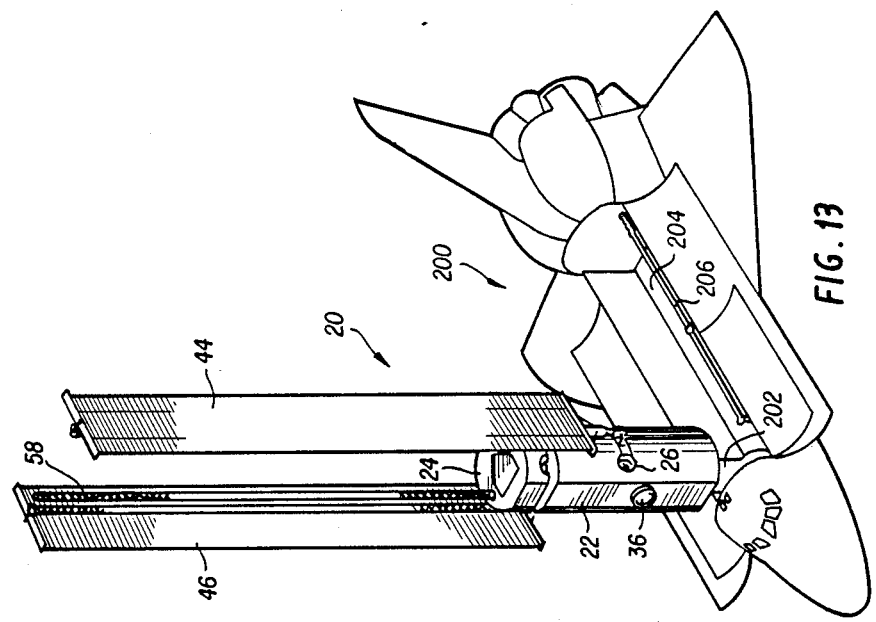

Referring to FIG. 13, the solar arrays 44 and 46 are slanted away from the Shuttle 200 and parallel with gravity gradient boom 58 to minimize mutual interference between the arrays and the Shuttle.

Figure 14:
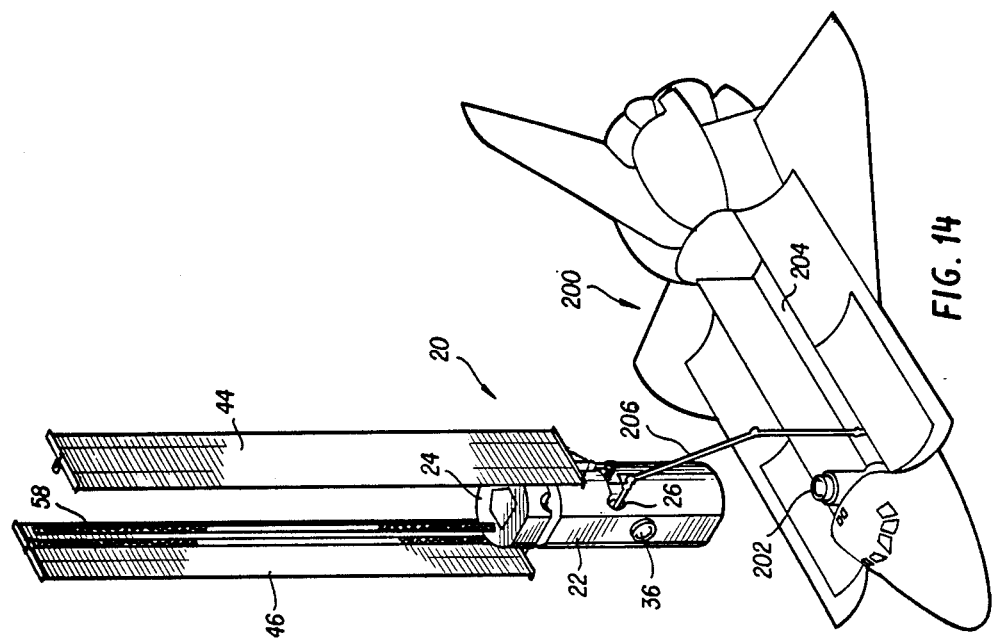

Referring to FIG. 14, Shuttle RMS 206 attaches to grapple fitting 26 on the facility module 22, unberths the spacecraft module 20 from berthing adapter 202 and holds the spacecraft at arm's length. The Shuttle then places the spacecraft module 20 in its proper flight altitude with substantially null rotation rates. The Shuttle RMS 206 then releases the spacecraft module 20 into its proper flight attitude and with little residual angular rates. The solar arrays are then rotated 90° by their alpha gimbals to their nominal operational position.

Figure 15:
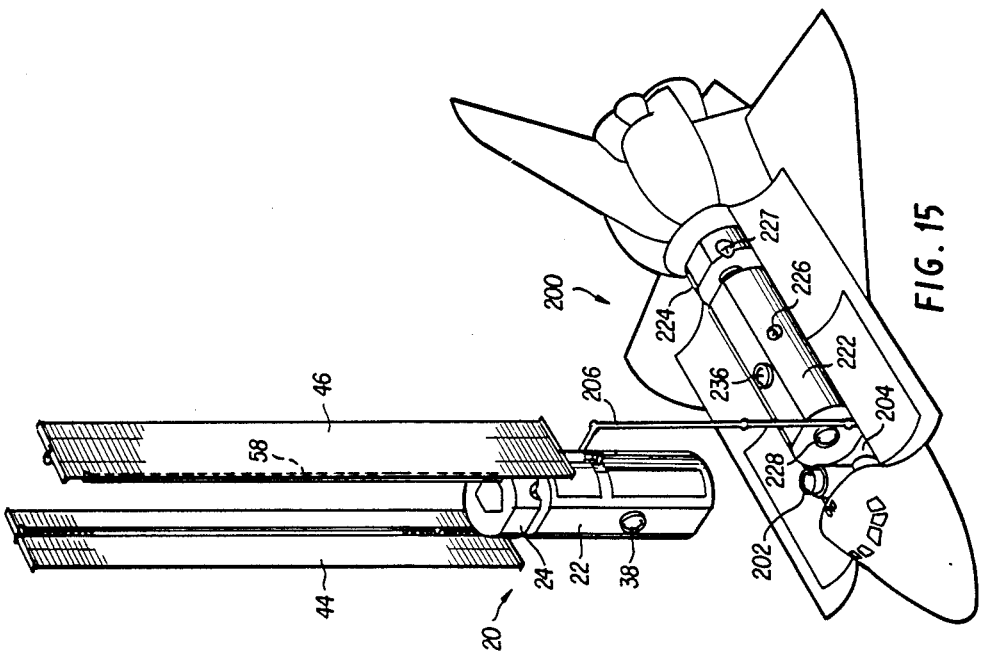

FIGS. 15-18 illustrate the deployment of a second spacecraft module which is to be coupled to the first spacecraft module to form a modular spacecraft system in accordance with the present invention. Referring to FIG. 15, the Shuttle 200 carrying the facility module 222 and the supply module 224 of the second spacecraft module assumes an attitude above the first spacecraft module 20 with its cargo bay 204 facing earth. The solar arrays 44 and 46 of first spacecraft module 20 are rotated from their nominal operational position extending in a direction normal to the longitudinal axis of the facility module 22 to a position parallel to the gravity gradient boom 58 as shown. The Shuttle RMS 206 then attaches to grapple fitting 26 on facility module 22 and connects berthing mechanism 28 with berthing adapter 202, with side berthing mechanism 36 facing aft to facilitate connection with the second facility module 222.

Figure 16:
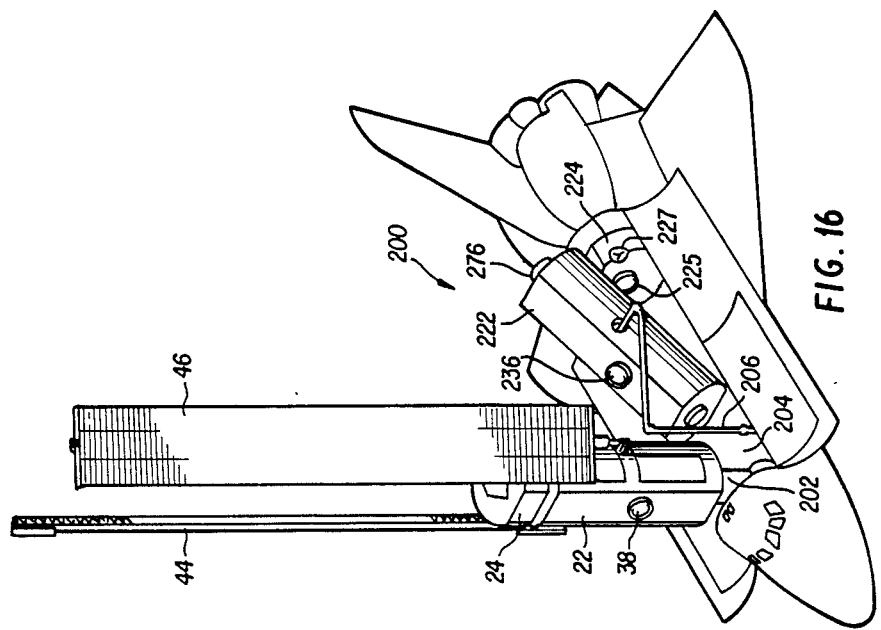
FIGS. 15-18 illustrate the deployment of a second spacecraft module which is to be coupled to the first spacecraft module to form a modular spacecraft system in accordance with the present invention.

Referring to FIG. 16, solar arrays 44 and 46 are rotated forward about their outboard gimbals to avoid interference with the second facility module 222 and second supply module 224. Shuttle RMS 206 then attaches to grapple fitting 226 on facility module 222, extracts the facility module 222 from the cargo bay 204, and connects berthing mechanism 236 on facility module 222 to berthing mechanism 36 on facility module 22.

Figure 17:
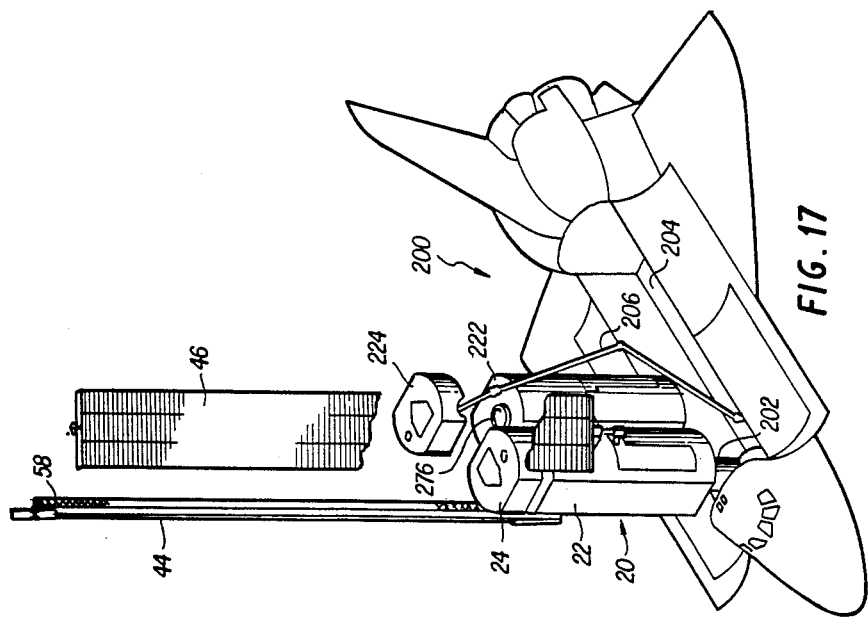

Referring to FIG. 17, Shuttle RMS 206 then attaches to grapple fitting 227 on second supply module 224, extracts the supply module 224 from the cargo bay 204, and connects berthing mechanism 225 on supply module 224 to berthing mechanism 276 on facility module 222. Solar array 46 is shown partially cut away so that the berthing of the supply module can be better seen.

Figure 18:
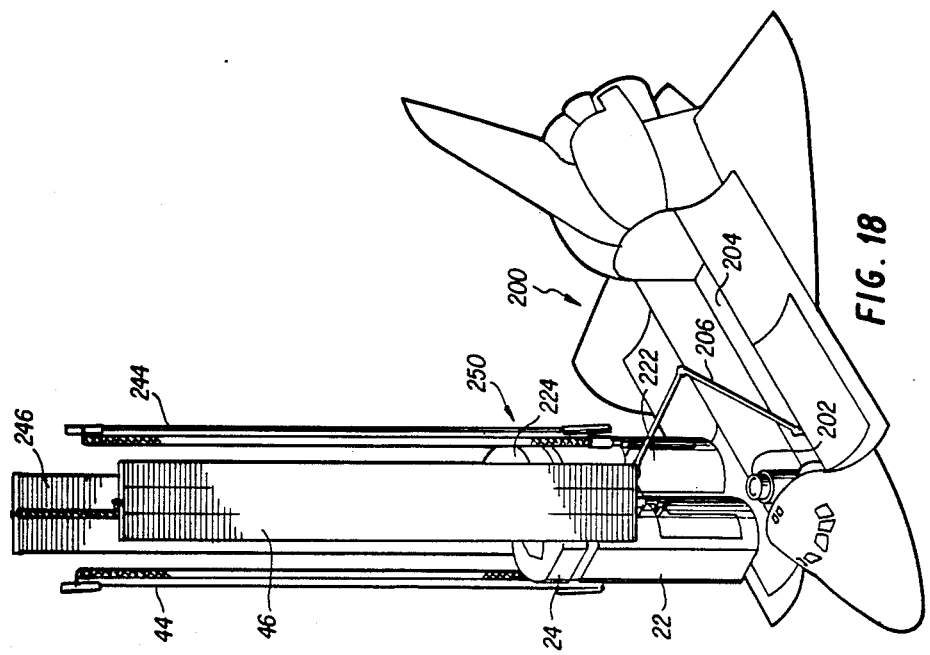

Referring to FIG. 18, solar arrays 244 and 246 are deployed and exercised as shown in FIG. 12 with respect to solar arrays 44 and 46. Solar arrays 244 and 246 are rotated about their outboard gimbals toward the rear of the Shuttle 200 to avoid interference with solar arrays 44 and 46. The modular spacecraft system 250 formed by coupling of the two spacecraft modules is then unberthed from berthing adapter 202 by attaching RMS 206 to grapple fitting 226 and extending the RMS to arms length. The Shuttle then places the modular spacecraft system 250 in its proper orbital flight attitude. The RMS then releases the modular spacecraft system 250 into its proper flight attitude. All of the solar arrays 44, 46, 244 and 246 are then rotated 90° about their central gimbals to place them in their nominal operational positions.

Although the present invention has been described with reference to a preferred embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A spacecraft module adapted for orbital flight and connectable to a substantially identical spacecraft module, said spacecraft module comprising:

a spacecraft body having a generally cylindrical shape comprising circumferential side walls, opposed end walls, and a longitudinal axis;

at least one solar array extendible outwardly from a first side wall area of the spacecraft body, wherein said solar array comprises an articulation means to permit the solar array to rotate about an axis parallel to the longitudinal axis of the spacecraft body; and at least one structural interface means located on a second side wall area of the spacecraft body spaced circumferentially from said first side wall area for connecting one spacecraft module to another spacecraft module in a side-by-side configuration, so that the longitudinal axes of their respective spacecraft bodies are parallel.

2. The spacecraft module of claim 1, further comprising a gravity gradient stabilization means which is extendible and retractable relative to one end of the spacecraft body.

3. The spacecraft module of claim 1 wherein the spacecraft body further comprises an inner chamber having a generally cylindrical shape which is located within the spacecraft body in a position such that the longitudinal axis of the inner chamber is parallel to and displaced from the longitudinal axis of the spacecraft body.

4. A modular spacecraft system adapted for orbital flight, and capable of expansion by the connection of substantially identical spacecraft modules, each of which is capable of independent operation when not connected to other modules, wherein said modular spacecraft systems comprises at least two spacecraft modules, each of said spacecraft modules comprising:

a spacecraft body adapted to carry a payload;

at least one solar array for generating electrical power;

means for controlling the attitude of the spacecraft module; and at least one structural interface means for connecting one spacecraft module to another spacecraft module;

wherein the attitude control means of at least one spacecraft module comprises a gravity gradient stabilization means which is extendible and retractable relative to the spacecraft body; and wherein each spacecraft body has three orthogonal axes, the solar array is extendible outwardly from a point on the spacecraft body which is generally along an axis parallel to one of the orthogonal axes, the gravity gradient stabilization means is extendible and retractable relative to the spacecraft body generally along an axis parallel to a second of the orthogonal axes, and the structural interface means is located on a side of the spacecraft in a plane normal to the third of the orthogonal axes.

5. The modular spacecraft system of claim 4 wherein the solar array comprises articulation means to permit the solar array to rotate about an axis parallel to the second orthogonal axis of the spacecraft body.

6. The modular spacecraft system of claim 5 wherein the spacecraft body has a generally cylindrical shape and the articulation means permits rotation about an axis parallel to the longitudinal axis of the spacecraft body.

* * * * *